June 22, 1971  H. L. KOTOWSKI  3,585,726
ANGULARY ADJUSTABLE STEM FOR DIAL INDICATORS AND THE LIKE
Filed Oct. 3, 1969

INVENTOR
HARRY L. KOTOWSKI
BY Morse, Altman & Oates
ATTORNEYS

United States Patent Office 3,585,726
Patented June 22, 1971

3,585,726
ANGULARLY ADJUSTABLE STEM FOR DIAL INDICATORS AND THE LIKE
Harry L. Kotowski, Lexington, Mass., assignor to B. C. Ames Company, Waltham, Mass.
Filed Oct. 3, 1969, Ser. No. 863,532
Int. Cl. G01b 5/00, 3/22
U.S. Cl. 33—148                                 8 Claims

ABSTRACT OF THE DISCLOSURE

An angularly adjustable stem is provided for use with dial indicators and the like. The stem includes a pair of articulated tubular sections each provided with a driving rod formed with rack teeth in mesh with a pinion gear rotatably mounted in the hinged portion of the tubular sections. One tubular section is fitted to the dial indicator with its rod drivingly engaging the stem of the indicator. The other tubular section may be set at various angular positions and its rod employed to engage the work. The dial indicator may be positioned at a selected angle about the axis of the stem.

BACKGROUND OF THE INVENTION (1) Field of the invention

This invention relates generally to measuring instruments such dial indicators and the like and more particularly is directed towards an angularly adjustable stem which may be integral with or an attachment for dial indicators, calipers and the like.

(2) History of the prior art

Conventional dial indicators normally include a rigid actuating stem for engaging the work being measured and which stem may extend either radially from the dial face or from the rear wall thereof, as in a right angle indicator. In either case the feeler stem is fixed with respect to the angle at which it operates the indicator. This, of course, limits the use and frequently, by reason of space, location or other conditions, a conventional dial indicator cannot be brought to bear on the work. It is, therefore, an object of the present invention to provide an angularly variable stem for use in conjunction with dial indicators and the like whereby measurements may be made with one instrument from various angular positions.

SUMMARY OF THE INVENTION

This invention features an angularly variable actuating stem for dial indicators and the like, comprised of a pair of articulated tubular sections, one of which is fitted to the dial indicator to drivingly engage its stem and the other section being angularly adjustable with respect thereto. Each section includes a movable rod having rack teeth, both in mesh with a common pinion gear located at the hinged joint of the two sections. Means are provided for locking the sections at a selected angle with respect to one another.

DETAILED DESCRIPTION OF THE PREFERRED EMBODIMENTS

Figure 1:
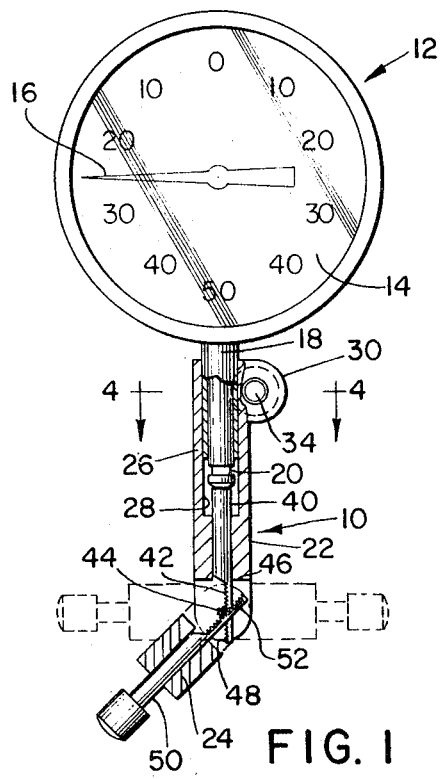
FIG. 1 is a view in front elevation partly in section of a dial indicator with a variable angle stem attachment made according to the invention.
Figures 2, 3:
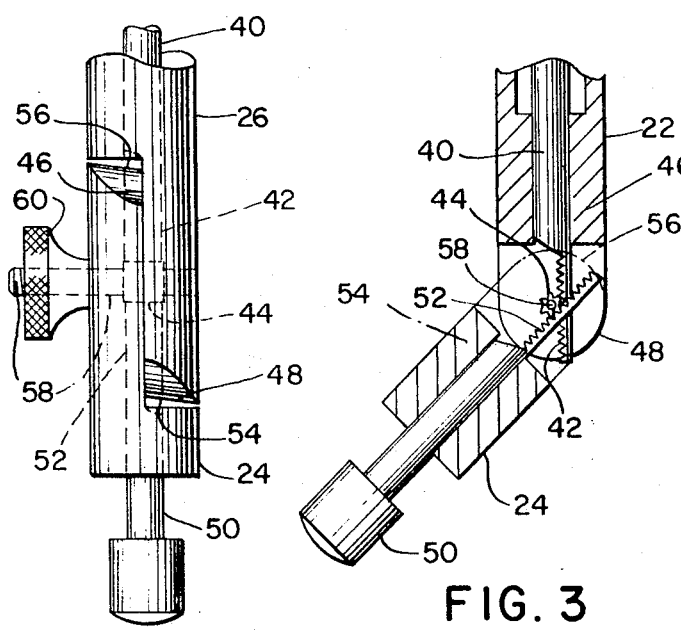
FIG. 2 is a detailed view in side elevation, partly in section, of the FIG. 1 attachment.
FIG. 3 is a cross-sectional view taken along the line 3—3 of FIG. 2.
Figure 4:
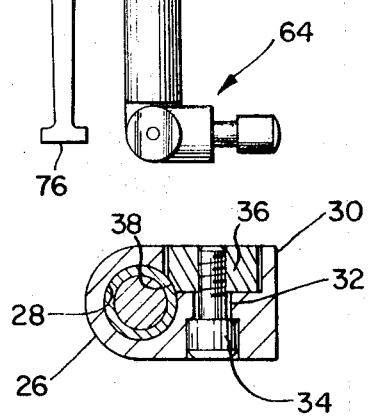
FIG. 4 is a cross-sectional view taken along the line 4—4 of FIG. 1, and, FIG. 5 is a view in front elevation showing a modification of the invention.

Referring now to the drawings and to FIGS. 1 through 3 in particular, there is illustrated a variable angle stem actuator 10 for use with a conventional dial indicator 12 customarily provided with a dial face 14, an indicator needle 16 and a radial post 18 through which extends an axially movable feeler rod 20. The instrument is operated by placing the end of the feeler rod against the work, the measurement being recorded on the graduated dial face. The instument may be use in only one position insofar as it must be held at a right angle to the face of the work being gauged. However, by using the angularly variably stem 10, the instrument may be used from any angular position.

The variable angle stem 10 assembly is comprised of two articulated sections 22 and 24, the section 22 being attached directly to the post 18 on the dial indicator while the section 24 is connected to the end of the section 22 for angular movement with respect thereof. The section 22 is comprised of a tubular member 26 having a central axial passage 28 the upper portion of which is dimensioned to fit snugly over the post 18. The tubular member 26 is clamped onto the post 18 to permit the parts to be locked together and at the same time to allow the dial indicator to be turned about the axis of the post with respect to the stem attachment 10.

In the illustrated embodiment the upper portion of the tubular member 26 is formed with an integral ear portion 30 formed with a transverse passage 32 perpendicular to and offset from the passage 28. Mounted in the passage 32 is a screw 34 engaging a tapped follower nut 36. The follower nut is formed with a beveled face 38 extending through an opening between the passage 32 and the passage 28 in position to engage the side of the post 18. By turning the screw 34 the follower nut 36 may be moved into and out of clamping engagement with the post 18 to permit removal of the attachment.

Mounted for axial movement in the lower end of the tubular member 26 is a rod 40 slidably received in a reduced portion of the passage 28 and formed at its lower end with rack teeth 42 in mesh with a pinion 44 mounted between the lower end of the tubular member 26 and the upper end of the tubular member 24. The section of rack teeth 42 is offset from the center line of the rod 40 and extends out through a cutaway portion 46 formed at the lower end of the tubular member 26, which cutaway portion terminates in a rounded end 48.

The tubular section 24 carries an axially slidable feeler rod 50 mounted therein, the rod being formed at its upper end with rack teeth 52 also in mesh with the pinion 44 and likewise offset from the center line of the rod 50. The rack teeth section of the rod 50 extends out through a cutaway portion 54 in the upper end of the tubular member and rounded at 56. The rounded ends and the cutaway portions of the two tubular members are configured to mate with one another in cooperating engagement to provide a hinge action between the parts. The two tubular members are connected to one another by means of a threaded stud 58, best shown in FIG. 2, with the right-hand end thereof fixed to the lower end of the tubular member 26 and extending through an opening formed in the upper end of the tubular member 24. The stud 58 carries the pinion 44 freely rotatable thereon and at its outer end is threaded to a knurled nut 60 by which the parts are tightened at a selected angular position.

By virtue of the configuration the tubular member 24 may be turned to any angular position within a 180° range as suggested in FIG. 1 to permit operation of the dial indicator. Once an angular position has been selected the knurled nut 60 is tightened so as to clamp the tubular members together. While tightening of the nut 60 on the stud 58 will fix the angle of the tubular members the pinion 44 remains free to rotate upon reciprocation of the feeler rod 50. The rod 50 is axially movable at any angular position and this axial movement will be transmitted through the pinion 44 to the rod 40. The rod 40, in turn, bears against the lower end of the rod 20 of the dial indicator so that the dial indicator will be actuated.

The variable angle stem may be furnished as an attachment separately from the dial indicator or it may be incorporated as an integral part of the dial indicator in which case the rod 40 could be of one-piece with the rod 20 and the post 18 would be integrated with the tubular member 26.

Figure 5:
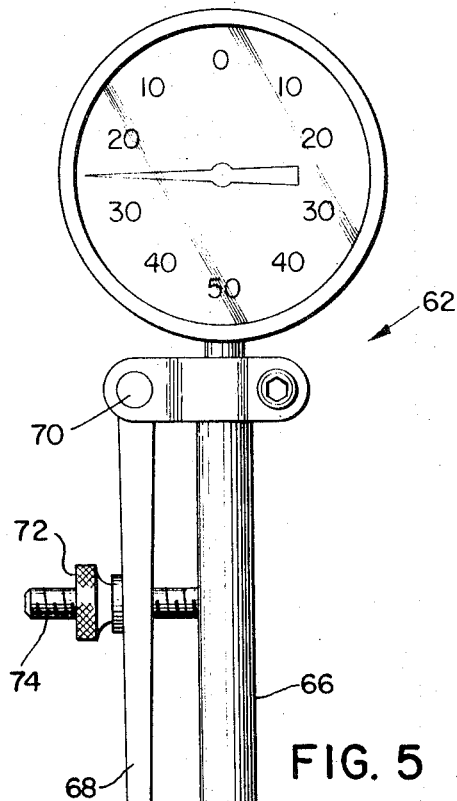

Referring now to FIG. 5 of the drawings there is illustrated a modification of the invention and in this embodiment a micrometer caliper 62 is provided with a variable angle stem 64. The micrometer caliper 62 is comprised of an elongated tubular shank 66 at the lower end of which is mounted a variable angle stem 64 similar in construction to the stem 10 of the principal embodiment. The elongated shank 66 may be an integral part of the instrument or it may be in the form of an attachment for a conventional dial indicator in the fashion of FIG. 1. In any event, the caliper includes an arm 68 hinged to the shank 66 by a pivot joint 70 at the upper end thereof, the arm 68 being controlled by means of an adjusting nut 72 threaded to a screw 74 fixed at the right-hand end to shank 66. The arm 68 may be formed with a work-engaging foot 76 extending perpendicularly from both sides of the arm end to permit use of the micrometer caliper for gauging both inside and outside dimensions. When making inside dimensions the stem 64 will be employed in the position illustrated while for taking outside dimensions the stem will be turned 180° to face oppositely the inwardly facing portion of the foot 76.

Direct readings may be made from the micrometer caliper and the construction is such that no errors will develop as the result of any spring action such as are inherent in conventional calipers. In practice, the micrometer will first be set to zero and used as a reference when gauging the work.

While the invention has been described with particular reference to the illustrated embodiments it will be understood that numerous modifications will appear to those skilled in the art. For example, while a simple pinion gear having a one-to-one ratio has been illustrated a multiplication factor can be introduced by using a compound or a stepped gear to increase the sensitivity of the instrument or to increase its range of operation. Also, the device may be made with more than two articulated sections since any number of sections may be drivingly connected to one another. Furthermore, the section ends may be rounded over 90° rather than the 180° shown to limit the angular adjustment to a range of 90°.

Having thus described the invention what I claim and desire to obtain by Letters Patent of the United States is:

1. An angularly adjustable stem, comprising in combination
    (a) at least a pair of tubular members pivotally connected to one another in end-to-end arrangement,
    (b) a rod mounted in each member for axial movement therein,
    (c) a pinion mounted between the ends of each connected pair of members for rotation about an axis perpendicular to the length of said members and rods,
    (d) the ends of each of said rods adjacent said pinion being formed with rack teeth in mesh with said pinion whereby axial movement of one of said rods will be transmitted to another of said rods, and,
    (e) a dial indicator having an axial movable feeler rod drivingly connected to one of the rods mounted in said members.

2. An angularly adjustable stem according to claim 1 including locking means engaging said members for locking adjacent members in selected angular relation to one another.

3. An angularly adjustable stem according to claim 1 including releasable mounting means on the free end of one of said members for mounting said one member to said dial indicator for actuation thereof.

4. An angularly adjustable stem according to claim 2 wherein said locking means includes a screw extending perpendicularly through said members and carrying said pinion and a nut threaded to said screw for clamping said members together.

5. An angularly adjustable stem according to claim 3 wherein said mounting means includes a screw extending perpendicularly through the end of said one member and a follower threaded to said screw, said member being formed with an opening in the wall thereof whereby said follower can engage a portion of said indicator in locking engagement.

6. An angularly adjustable stem according to claim 1 wherein adjacent ends of said members are cut away into cooperating semi-cylindrical oppositely facing portions and rounded at the ends thereof.

7. An angularly adjustable stem according to claim 1 wherein the rack toothed ends of said rods are offset from the centerline of said rods.

8. An angularly adjustable stem for dial indicators and the like, comprising in combination
    (a) at least a pair of tubular members pivotally connected to one another in end-to-end arrangement,
    (b) a rod mounted in each member for axial movement therein,
    (c) a pinion mounted between the ends of each connected pair of members for rotation about an axis perpendicular to the length of said members and rods,
    (d) the ends of each of said rods adjacent said pinion being formed with rack teeth in mesh with said pinion whereby axial movement of one of said rods will be transmitted to another of said rods, and,
    (e) a caliper arm pivotally connected to one of said members.

References Cited
UNITED STATES PATENTS

| 2,026,459 | 12/1935 | Caretta | 74—110 |
| 3,007,250 | 11/1961 | Fisk | 33—172 |
| 1,695,453 | 12/1911 | Carpenter | 33—172 |

LEONARD FORMAN, Primary Examiner

A. J. MIRABITO, Assistant Examiner

U.S. Cl. X.R.

33—172